Feb. 18, 1958 W. C. PIERCE 2,823,776
MULTIPLE MAGNETIC FRICTION DEVICE
Filed July 16, 1953 2 Sheets-Sheet 1
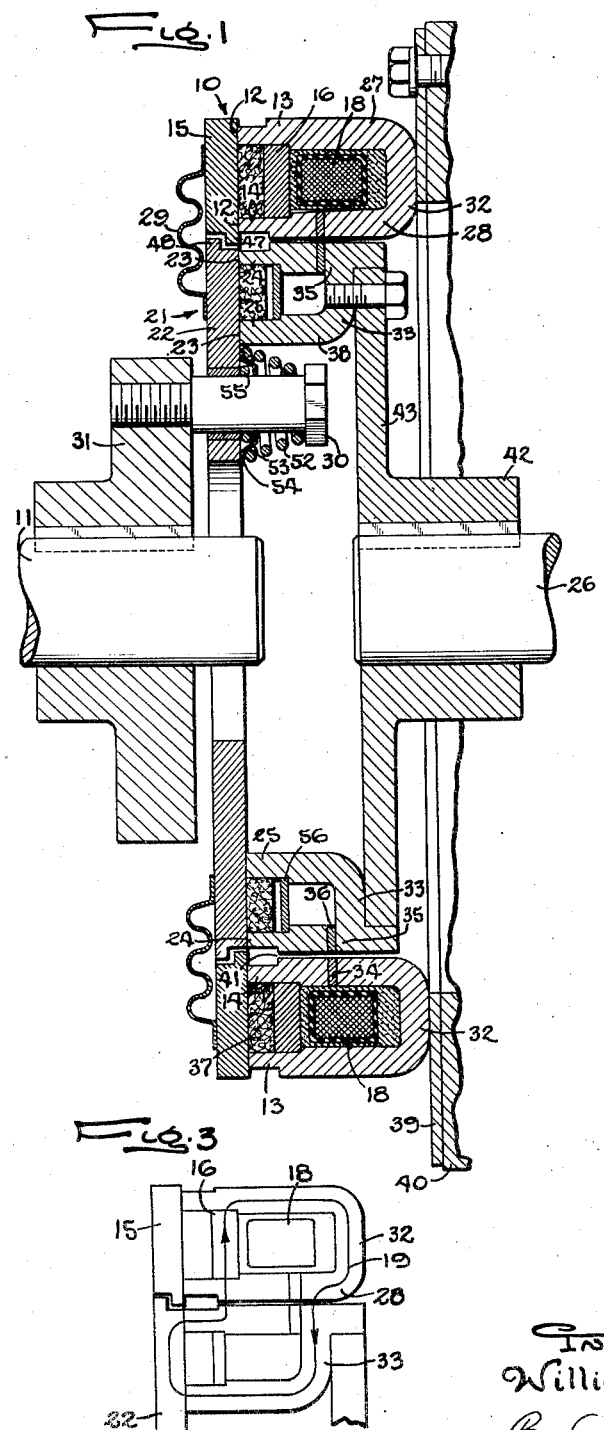
INVENTOR
William C. Pierce
By Carlson, Pitzner Hulfard + Wolfe
ATTORNEYS Feb. 18, 1958     W. C. PIERCE     2,823,776
MULTIPLE MAGNETIC FRICTION DEVICE
Filed July 16, 1953     2 Sheets-Sheet 2
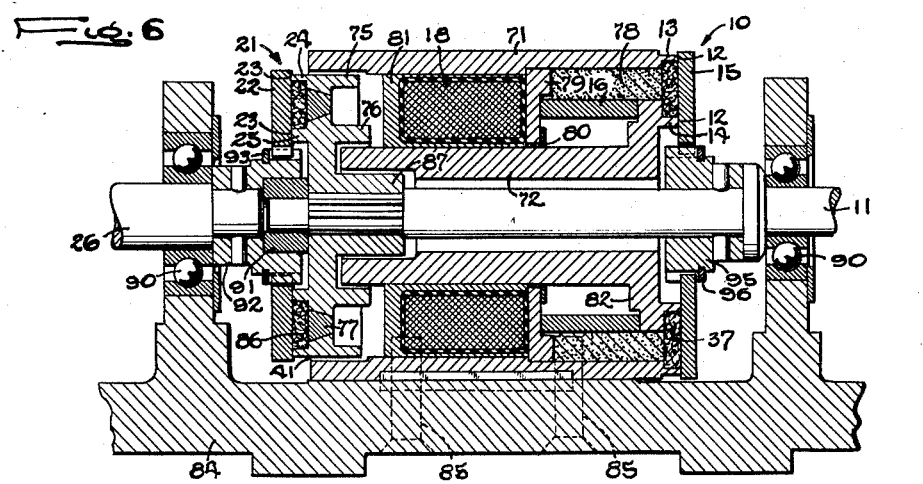
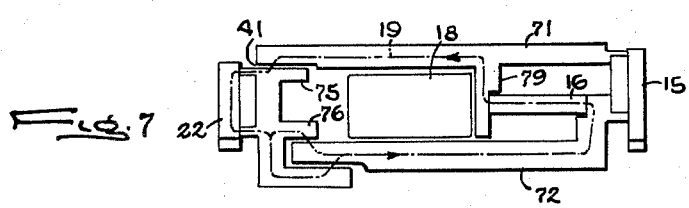
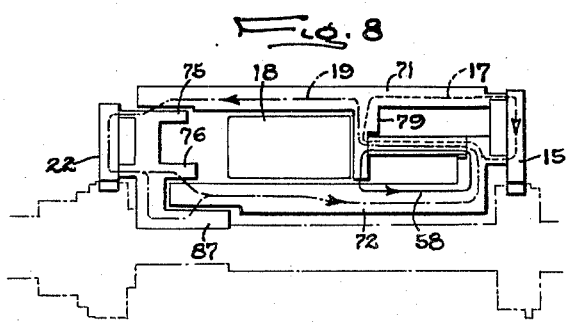
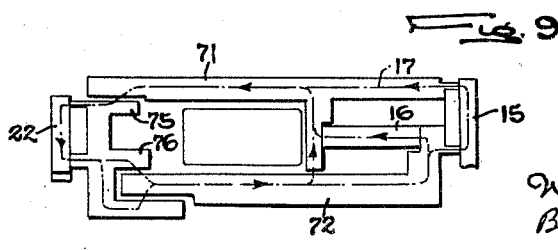
INVENTOR
William C. Pierce United States Patent Office 2,823,776
Patented Feb. 18, 1958

2,823,776

MULTIPLE MAGNETIC FRICTION DEVICE

William C. Pierce, Beloit, Wis., assignor to Warner Electric Brake & Clutch Company, South Beloit, Ill., a corporation of Illinois Application July 16, 1953, Serial No. 368,404

17 Claims. (Cl. 192—18)

This invention relates to magnetic torque producing devices of the type in which an armature is drawn into frictional gripping engagement with pole faces of a magnetic core by flux derived from a permanent magnet and in which the armature is released upon energization of a coil arranged to produce a flux in the pole faces opposing that of the permanent magnet. More particularly, the invention has reference to a friction device in which the magnetic core, the permanent magnet, and the armature cooperate to define two parallel toroidal flux paths, a main path of relatively low reluctance extending from the poles of the magnet through the pole faces and the armature and an auxiliary path of higher reluctance bypassing the pole faces and providing a shunt through which the permanent magnet flux is diverted upon energization of the coil.

One object of the invention is to enlarge the range of usefulness of a device of the above character by associating with it a second magnetic torque producing device which is activated by the flux diverted into the shunt path upon energization of the coil so that the two devices are rendered effective alternately in response to energization and deenergization of a single coil.

Another object is to achieve the foregoing object by extending the auxiliary path through a second pair of pole faces and a coacting armature and by correlating the reluctances of the flux paths through the two armatures to cause only a small amount of the permanent magnet flux to thread the auxiliary path whereby to release the second armature from its pole faces when the coil is deenergized.

A further object is to construct the two friction devices in a novel manner such as to reduce the permanent magnet flux in the second armature when the coil is deenergized and thereby insure more effectual release of the second armature from its pole faces.

The invention also resides in the novel ways of effecting reduction of the permanent magnet flux in the second armature when the coil is deenergized.

Another object is to arrange the coacting magnetic parts of the two friction devices in a novel manner to provide optimum axial compactness.

Other objects and advantages of the invention will become apparent from the following detailed description taken in connection with the accompanying drawings, in which Figure 1 is a diametrical sectional view of a multiple magnetic torque producing unit embodying the novel features of the present invention.

Figs. 2, 3, 4 and 5 are diagrammatic views showing the distribution of flux under different operating conditions.

Fig. 6 is a view similar to Fig. 1 of a modified form of the invention.

Figs. 7, 8 and 9 are diagrammatic views showing the flux distribution in the modified form of the invention under different operating conditions.

While the invention is susceptible of various modifications and alternative constructions, I have shown in the drawings and will herein describe in detail the invention as applied to torque producing devices of the type in which axially facing friction surfaces formed on relatively rotatable parts are drawn into gripping engagement with each other by a magnetic flux threading back and forth axially through the surfaces. It is to be understood, however, that I do not intend to limit the invention by such disclosure but aim to cover all modifications and alternative constructions and uses falling within the spirit and scope of the invention as expressed in the appended claims.

The improved torque producing apparatus shown in the drawings by way of illustration includes a brake 10 having stationary pole pieces 13 and 14 in the form of radially spaced concentric rings of magnetic material terminating in axially facing pole faces 12. In the preferred form shown in Fig. 1, the pole pieces are the end portions of the legs 27 and 28 of a ring or annular core 32 of magnetic material of U-shaped cross section stationarily mounted as by a plate 39 welded to the closed end of the U and bolted to a fixed support 40. Segments 37 of suitable non-magnetic wear resistant material span the pole pieces 13 and 14 to form a friction face which is flush with the pole faces 12. For a purpose to appear later, the inner pole piece 14 and the remainder of the inner leg 28 of the core 32 are separated magnetically by a ring 34 of nonmagnetic material such as brass secured as by brazing to the opposed ends of the two parts.

Spanning the pole faces 12 and adapted for axial gripping engagement therewith is a flat armature ring 15 of magnetic material mounted on a driven shaft 11 so that a retarding torque is applied to the latter when the armature is drawn into gripping engagement with the pole faces by magnetic flux threading axially back and forth through the coacting friction surfaces. In this instance, the armature mounting comprises an annular disk 29 secured as by welding at its outer periphery to the back of the armature and at its inner periphery to one side of a second or inner flat ring 22 of magnetic material concentric with the armature and lying in the plane of the latter. To provide for axial floating of the armature rings 15 and 22, shouldered studs 30 extend through bushed holes around the inner peripheral edge of the inner ring 22 and thread into a disk 31 whose hub is keyed to the shaft. Radially spaced convolutions on the disk 29 permit flexing of the latter and axial movement of the magnetic rings relative to each other.

Magnetic flux for drawing the armature 15 into engagement with the pole faces 12 to apply the brake is derived from a permanent magnet 16 spanning the pole pieces 13 and 14 and having end poles of opposite polarity spaced axially from the respective pole faces. The permanent magnet thus cooperates with the armature 15 and the pole pieces 13 and 14 to define a main toroidal flux path extending from the poles of the permanent magnet through the pole faces 12 and the armature as indicated by the dotted line 17 in Fig. 2. Herein, the permanent magnet comprises an annular series of flat radially disposed bars seated against axially facing shoulders on the pole pieces 13 and 14 disposed beneath the wear resistant segments 37.

Release of the brake 10 is effected by energization of a multiple turn annular coil 18 surrounded by an auxiliary toroidal flux path which extends through the permanent magnet 16 but by-passes the pole faces 12 as indicated by the full line 19 in Figs. 2 and 3. The flux resulting from energization of the coil tends to follow the auxiliary path 19 in the portion of the latter extending around the coil from one pole of the permanent magnet to the other but, where the auxiliary path joins the main path, tends to divide between the permanent magnet 16 and the portion of the main path 17 extending through the brake armature 15. To release the brake, the coil is energized by a current flowing therethrough in a proper direction and in an amount correlated with the number of turns in the coil so that the coil flux tending to thread the brake armature 15 is opposed and substantially equal to the flux from the permanent magnet threading the armature that is, the coil flux tends to thread the armature in a radial and outward direction opposite to the inward direction indicated for the permanent magnet flux in Fig. 2. In other words, the coil is energized to produce, between the pole faces 12 which are spaced axially from the end poles of the permanent magnet, a magnetomotive force opposing and substantially equal to the magnetomotive force between the pole faces due to the permanent magnet. The permanent magnet flux in the armature is thus cancelled or diverted away from the main path 17 and into the auxiliary or shunt path 19 and the magnetic potential between the pole faces is reduced substantially to zero to release the armature and substantially all of the flux of the coil 18 and the permanent magnet 16 threads the shunt path 19 as illustrated in Fig. 3. In this instance, the coil is embedded in a suitable hardened filler in the space between the permanent magnet 16 and the closed end of the core 32.

When the coil 18 is deenergized, the flux from the permanent magnet 16 threads the flux paths 17 and 19 as illustrated in Fig. 2 in the directions indicated by the arrows and divides between the main path 17 indicated by dotted line and the auxiliary path 19 indicated by the full line. To cause a major portion of the permanent magnet flux to thread the main path for applying the brake 10, the reluctance of the main path is made substantially lower than the reluctance of the auxiliary path. Herein, the reluctance of the main path is less than half of the auxiliary path reluctance and approximately 70 percent of the permanent magnet flux threads the main path, the remainder of the permanent magnet flux by-passing this path.

In accordance with the present invention, the flux threading the auxiliary path 19 upon energization of the coil 18 as shown in Fig. 3 to release the brake 10 is utilized to draw the magnetic elements of a second friction device 21 into gripping engagement with each other. For this purpose, the auxiliary flux path 19 into which the permanent magnet flux is diverted upon energization of the coil as described above is extended outwardly away from the magnetic elements of the brake 10 and back and forth through the magnetic elements of the second device 21. The latter, in this instance, is a clutch of the axially engaging type for transmitting rotary power from a driving shaft 26 to the driven shaft 11.

The clutch 21 comprises pole faces 23 defined by radially spaced pole pieces 24 and 25 and spanned by and adapted for axial gripping engagement with the inner magnetic ring 22 which constitutes the armature for the clutch and, which, as described above, is carried by and rotatable with the driven shaft 11. In the form of the invention shown in Fig. 1, the clutch pole pieces 24 and 25 are the end portions of the legs 35 and 38 of a second ring or core 33 of magnetic material of generally U-shaped cross section carried by the driving shaft 26 and concentric with the axis of the latter and with the brake core 32. To mount the clutch core 33 on the driving shaft 26, a disk 43 bolted to the closed end of the U is formed with a hub 42 keyed to the shaft. The friction face of the clutch magnet is completed by segments of nonmagnetic wear resistant material spanning the pole pieces 24 and 25.

To extend the auxiliary flux path 19 of the brake 10 through the clutch pole faces 23 and the clutch armature 22 as shown in Figs. 2 and 3, the outer leg 35 of the clutch core is telescoped closely with the inner leg 28 of the brake core 32, being separated from the latter by a gap 41 made of minimum radial width, only a few thousandths of an inch, by accurate mounting of the brake and clutch core rings. As in the case of the inner leg of the brake core, the outer leg 35 of the clutch core is composed of two parts separated by and brazed to a nonmagnetic brass ring 36 disposed substantially in the plane of the ring 34. The rings 34 and 36 provide sufficient reluctances to force the flux radially back and forth from one core to the other and axially back and forth through the clutch pole faces 23 and the armature 22.

It will be apparent from the foregoing that the closed end of the brake core 32 and the closed end of the clutch core 33 cooperate to define a member which, although composed of relatively rotatable parts, connects the outer pole of the permanent magnet 16 magnetically to the inner pole piece 25 of the clutch 21. Similarly, a portion of the inner brake pole piece 14 against which the inner end of the permanent magnet abuts together with the adjacent closely telescoping portion of the outer clutch pole piece 24 constitute a second member by which the outer clutch pole piece 24 is connected magnetically to the inner permanent magnet pole. These magnetic members cooperate with the magnetic elements of the clutch 21 to define the auxiliary toroidal flux path 19.

In the operation of the improved multiple magnetic friction device constructed as thus far described, approximately 70 percent of the flux from the permanent magnet 16 threads the main flux path 17 through the brake armature 15 and a smaller percentage of this flux threads the path 19 through the clutch armature 22 as shown in Fig. 2 when the coil is deenergized. The flux in the main path is sufficient to draw the brake armature into axial gripping engagement with its stationary pole faces 12 to apply the brake and stop the driven shaft 11, the clutch armature 22 being attracted to its pole faces 23 by a smaller force and therefore slipping relative to the latter.

To release the brake 10 and apply the clutch 21 the coil 18 is energized to reduce the magnetomotive force across the brake pole faces 12 to zero and divert the permanent magnet flux into the auxiliary path 19 and through the clutch armature 22 as shown in Fig. 3. The clutch armature 22 is thus drawn into axial gripping engagement with its pole faces to couple the driving and driven shafts together and the brake armature 15 slips relative to its pole faces 12.

The frictional drag on the clutch armature 22 caused by permanent magnet flux threading the auxiliary path 19 through the clutch pole faces 23 when the coil 18 is deenergized is not objectionable under some operating conditions where such deenergization of the coil occurs infrequently and the clutch 21 is applied most of the time. Under other conditions where the brake 10 is applied a large part of the time, however, it is desirable to reduce this drag on the clutch 21 during application of the brake to avoid wear on the friction surfaces of the clutch and to render the multiple unit more efficient by the removal of driving torque from the driven shaft 11.

To insure substantially complete release of the clutch 21 and thereby avoid the frictional drag on the clutch armature 22 when the brake 10 is applied, the invention contemplates a reduction of the permanent magnet flux threading the clutch armature 22 substantially to zero when the coil 18 is deenergized. One way of accomplishing this is to divert the flux away from the clutch armature by a small permanent magnet 56 which is arranged to produce a magnetic potential across the clutch pole faces 23 opposed and substantially equal to that of the first permanent magnet 16 and which defines a shunt flux path 19a (Fig. 5) forming a part of the auxiliary flux path 19 and by-passing the clutch armature. Herein, the second permanent magnet 56 which is much smaller than the main magnet 16 is formed as a flat ring of high carbon steel spanning and concentric with the clutch poles pieces 24 and 25 behind the wear resistant segments and spaced axially from the clutch pole faces 23.

Referring to Fig. 5 which shows the distribution of flux in the auxiliary path 19 when the coil 18 is energized and the auxiliary path includes the second magnet 56 in shunt with the clutch armature 22, it will be seen that a portion of this flux threads the clutch armature and the remaining portion threads the shunt path 19a through the second magnet. The latter has a small cross sectional area to saturate at a low value of flux and force the major portion of the flux through the clutch armature. That portion threading the second magnet 56 magnetizes the latter so that, when the coil is deenergized, the residual magnetic potential of the second magnet across the clutch pole pieces 24 and 25 tends to direct through the clutch poles and armature a flux which is opposed and substantially equal to that of the main magnet 16. Under this condition which is illustrated in Fig. 4, substantially all of the flux produced in the auxiliary path 19 by the main magnet 16 by-passes the clutch armature and threads the second magnet.

Another way to reduce the permanent magnet flux threading the clutch armature 22 when the coil 18 is deenergized is to move the armature away from its pole faces 23 and thereby increase the reluctance of the flux circuit through the armature. To accomplish this, the latter is yieldably urged axially away from its pole faces 23 by a force correlated with and less than the magnetic attractive force between the armature and the pole faces when the coil is energized but greater than this force when the coil is deenergized. Herein, this yieldable force is derived from a plurality of coiled compression springs 52 encircling the studs 30 and acting between the shoulders of the latter and dished washers 53 each encircling a stud and having an outer offset edge 54 bearing against the armature ring 22.

Outward movement of the armature 22 is limited to a small predetermined distance from the pole faces 23 regardless of wear on the friction surfaces of the clutch 21 by stops 55 in the form of split rings of resilient material. One of these rings encircles each shouldered stud 30 between the armature ring and the inner peripheral edge of the washer 53 and grips the stud with a frictional force greater than that exerted by the springs 52 but less than the attractive force of the flux threading the pole faces when the coil 18 is energized. The spacing between the armature and the inner peripheral edge of each washer 53 is equal to the axial thickness of each split ring 55 plus the desired width of the air gap between the armature and the pole faces, herein approximately $\frac{1}{32}$ of an inch.

To hold the clutch armature 22 against drifting away from the washers 53, the outer peripheral edge of the flexible disk 29 is axially offset from its inner peripheral edge in an outward direction away from the brake core 32 so that the disk acts as a spring yieldably urging the two armatures 15 and 22 axially in opposite directions away from positions in which their friction surfaces lie in a common plane. The clutch armature is urged toward the washers and the clutch pole faces 23 and the brake armature 15 is urged outwardly away from its pole faces 12. The amount of offset of the peripheral edges of the flexible disk 29 is slight so that the inward force exerted thereby on the clutch armature is less than that exerted in the opposite direction by the coiled springs 52.

By yieldably urging the brake armature 10 axially away from its pole faces 12, the flexible disk 29 effects complete release of the brake 10 when the coil 18 is energized to reduce the magnetomotive force across the brake pole pieces 13 and 14 substantially to zero. Such axial movement of the brake armature is limited by axially engageable flanges 47 and 48 formed integral with the armature rings and respectively projecting radially and inwardly from the inner periphery of the brake armature on the inner side thereof and radially and outwardly from the outer periphery of the clutch armature 22 on its outer side. The extent of outward movement of the brake armature from its pole faces 12 is limited to approximately $\frac{1}{32}$ of an inch by the flanges 47 and 48 when the clutch armature engages its pole faces 23. This gap is small enough to be overcome by the flux from the main permanent magnet 16 for applying the brake 10 when the coil 18 is deenergized.

Flux in the clutch armature 22 due to the main magnet 16 when the coil 18 is deenergized may also be reduced through the provision of a third toroidal path 58 for this flux extending from the poles of the main magnet around the closed end of the brake core 32 and through the non-magnetic ring 34 and by-passing both armatures 15 and 22 as shown by the dot-dash lines in Figs. 4 and 5. This third path 58, in the form of the invention shown in Fig. 1, is of higher reluctance than either the main flux path 17 or the auxiliary path 19. Herein, the reluctances of the three paths are correlated so that the distribution of the flux from the main magnet when the coil is deenergized as shown in Fig. 4 is approximately 70 percent through the main path 17, 20 percent through the auxiliary path 19, and 10 percent through the third path 58.

Such correlation of the reluctance of the third path 58 with the reluctances of the main and auxiliary paths 17 and 19 is effected by selecting the proper axial thickness of the nonmagnetic ring 34 which, in this instance, is approximately .062 of an inch thick or more than twice the radial dimension, approximately .020 of an inch, of the running air gap 41. The reluctance of the path extending back and forth across the air gap 41 and through the nonmagnetic ring 36 of the clutch core 33 is sufficiently greater than the reluctances of the other paths that substantially no flux threads this path. In addition to reducing the amount of main permanent magnet flux threading the auxiliary path 19, the third flux path 58 acts as a keeper circuit for the main magnet when the apparatus is disassembled and the armatures 15 and 21 are separated from their respective pole faces.

In the operation of the multiple magnetic device shown in Fig. 1, assuming the coil 18 is deenergized, a major portion of the flux of the main magnet 16 will thread the main flux path 17 as shown in Fig. 4 to draw the brake armature 15 into gripping engagement with its pole faces 12. The remainder of the main magnet flux will be divided between the auxiliary path 19 and the third path 58, that portion in the auxiliary path substantially all going through the second permanent magnet 56 due to the action of the latter in producing a flux in the clutch poles and armature opposed to that produced by the main magnet. As a result, the clutch 21 is released because there is an insufficient magnetic attractive force across the clutch pole faces 23 to overcome the force of the coil springs 52 and draw the clutch armature 22 into engagement with the pole faces 23.

When the coil 18 is energized, the flux produced thereby threads the flux paths as illustrated in Fig. 5. Since the flux produced by the coil in the main path 17 is opposed and substantially equal to that of the main magnet 16, the main magnet flux is diverted into the auxiliary and third paths 19 and 58 and the resultant flux in the main path is substantially zero so that the brake armature 15 is free to move away from its pole faces 12 under the action of the disk spring 29. That portion of the diverted flux threading the auxiliary path is divided between the clutch pole faces 23 and the shunt path 19a through the second permanent magnet 56. The latter becomes saturated at a low value of flux as described above so that the major portion of the flux in the auxiliary path threads the clutch armature 22 to overcome the coil springs 52 and the air gap between the clutch pole faces 23 and the armature 22 to draw these clutch elements into frictional gripping engagement.

Where it is desired to reduce the radial dimension of the improved multiple magnetic friction device, the magnetic elements of the two friction devices 10 and 21 may be spaced apart axially along the driven shaft 11 as shown in Figs. 6 to 9. The parts of this modified form of the invention corresponding to the parts of the preferred form of Figs. 1 to 5 are designated by the same reference numbers. In the modification (Fig. 6), the first friction device 10 is a brake having an armature 15 in the form of a flat annular disk of magnetic material spline coupled at its inner periphery to a sleeve 95 fast on the driven shaft 11. The latter and the drive shaft 26 are mounted coaxially in bearings 90 carried by a fixed support 84, one end of the driven shaft being journaled in a bushing 91 carried by a sleeve 92 fast on the adjacent end of the drive shaft 26.

Cooperating with the brake armature 15 and adapted for axially gripping engagement therewith are the axially facing pole faces 12 of the brake pole pieces 13 and 14 which are defined by radially spaced end portions of two stationary cylinders 71 and 72 concentric with and extending along the driven shaft 11. The inner pole piece 14 projects axially toward the armature from an out-turned flange 82 on the inner fixed cylinder 72. To support the cylinders 71 and 72 stationarily, the outer cylinder 71 is secured as by bolts 85 to the fixed support 84. The inner cylinder 72 is centered within the outer one by a flat radially disposed ring 79 of magnetic material spaced axially along the cylinders from the pole pieces and out-turned flange 82 on the inner cylinder. At its outer periphery, the magnetic ring 79 has a tight press fit with the inner periphery of the outer cylinder 71. The inner periphery of the ring 79 is spaced radially from the inner cylinder 72 to define an annular air gap which is filled by a ring 80 of non-magnetic material such as brass having a tight press fit with the magnetic ring 79 and the inner cylinder 72.

The brake pole pieces are of reduced cross-section and receive between them a plurality of angularly spaced segments 37 of suitable nonmagnetic wear resistant material flush with the pole faces 12 and fitting against axially facing shoulders on the cylinders 71 and 72. Axial movement of the brake armature 15 along its spline and away from the pole faces 12 is limited by a snap ring 96 fitting into an annular groove in the sleeve 95 on the driven shaft.

In the modification shown in Fig. 6, the main permanent magnet 16 is a cylinder concentric with and disposed between the fixed cylinders 71 and 72 and magnetized axially with its poles located at its opposite ends. To define the main toroidal flux path 17 through the brake armature 15, the permanent magnet spans and abuts axially at opposite ends against the radially disposed magnetic ring 79 and the out-turned flange 82 on the inner cylinder 72. With this construction, the main toroidal flux path as indicated by the dotted line 17 in Fig. 8, extends from one pole of the permanent magnet 16, first radially and outwardly through the flat ring 79 to the outer fixed cylinder 71, then axially along the latter to the outer brake pole piece 13, and finally through the armature and the inner brake pole piece 14 and axially across the out-turned flange 82 to the other magnet pole. The direction of flux in the various paths shown in Figs. 7, 8 and 9 is indicated by arrows for purposes of illustration.

To divert the permanent magnet flux away from the main flux path 17 through the brake armature 15, the coil 18 is disposed between the fixed cylinders 71 and 72 and is energized by current flowing in a proper direction and a proper amount to produce a magnetomotive force across the brake pole pieces 13 and 14 opposed and substantially equal to the magnetomotive force of the magnet. The permanent magnet flux is thus diverted into the auxiliary flux path which, as in the preferred form of the invention, extends through the permanent magnet and by-passes the brake armature, as indicated by the dot-dash line 19 in Fig. 7. Herein, the coil is embedded in a suitable cement 81 between the fixed cylinders 71 and 72 on the side of the flat magnetic ring 79 opposite the permanent magnet 16 and the brake pole pieces 13 and 14. This cement, the magnetic ring 79 and non-magnetic ring 80 which together span the cylinders 71 and 72, and a suitable cement 78 filling the annular space bounded by the outer cylinder, the permanent magnet 16, the magnetic ring 79, the wear segments 37, and the inner end of the out-turned flange 82 on the inner cylinder all cooperate to secure the cylinders together as a rigid unit.

To extend the auxiliary flux path 19 through the magnetic elements of the second friction device 21 which herein is a clutch, the end portions of the fixed cylinders 71 and 72 remote from the brake 10 telescope closely with two magnetically separated rotatable cylinders 75 and 76 defining the clutch pole pieces 24 and 25 and adapted for axial gripping engagement with the clutch armature 22. The auxiliary path extends radially back and forth between the fixed and rotatable cylinders and the flux diverted into this path upon energization of the coil 18 is thus utilized to draw the clutch armature 22 into engagement with the clutch pole faces 23. The rotatable cylinders 75 and 76 are concentric with and disposed within the fixed cylinders 71 and 72 and are secured together as a unit and separated magnetically by a ring 77 of nonmagnetic material such as brass brazed to the respective cylinders. This rotatable unit is mounted on the driven shaft 11 for rotation with the latter by a cylindrical hub 87 formed integral with the inner rotatable cylinder 76 and spline coupled to the shaft with a tight press fit to prevent axial movement of the unit relative to the shaft. The hub overlaps axially with the inner fixed cylinder 72 and telescopes closely therewith for the flow of flux radially between these parts. As in the preferred form of the invention shown in Fig. 1, the air gaps 41 separating the overlapping ends of the fixed and rotatable cylinders are made of minimum radial width on the order of a few thousandths of an inch by accurate mounting of the cylinders. The clutch pole pieces 24 and 25 which are reduced end portions of the rotatable cylinders are spanned by a plurality of angularly spaced segments 86 of nonmagnetic gear resistant material flush on their outer faces with the clutch pole faces 23.

The clutch armature 22 is a flat annular disk of magnetic material spanning the pole pieces 24 and 25 and spline coupled at its inner periphery to the sleeve 92 on the drive shaft 26. Axial floating movement of the clutch armature away from the clutch pole faces is limited by a snap ring 93 which fits into an annular peripheral groove on the driven shaft sleeve 92.

To reduce the amount of flux in the auxiliary path 19 to insure effective release of the clutch 21 when the coil 18 is deenergized, the inner peripheral portion of the magnetic ring 79 between the permanent magnet 16 and the inner fixed cylinder 72 cooperates with the latter to define the third toroidal flux path 58 which, as in the apparatus of Fig. 1, extends through the permanent magnet and by-passes the armatures 15 and 22 of both friction devices as indicated by the full line 58 in Fig. 8. The reluctance of this path is correlated with and made greater than that of the main path but less than that of the auxiliary path by selecting a proper radial width of the air gap filled with the brass ring 80, the latter in this instance having a width of approximately .008 of an inch. Thus, when the coil 18 is deenergized, the operating condition illustrated in Fig. 8, a major portion of flux from the magnet 16, herein approximately 60 percent, threads the main path 17 as indicated by the dotted line in Fig. 8, approximately 30 percent threads the third path 58, and the remainder threads the auxiliary path 19 through the clutch armature 22. Because the minor portion of permanent magnet flux threading the auxiliary path 19 is much less than that in the main path 17, the clutch armature 22 slips relative to its pole faces 23 while the brake armature 15 is drawn into frictional gripping engagement with its pole faces 12 when the coil is deenergized.

When the coil 18 is energized, the flux produced thereby threads the flux paths as illustrated in Fig. 9, assuming that there is no flux from the permanent magnet 16. This coil flux is opposed and approximately equal to the permanent magnet flux in the brake armature 15 and in that portion of the flat magnetic ring 79 between the permanent magnet 16 and the inner fixed cylinder 72, but augments the permanent magnet flux threading the clutch armature 22. Thus, when the fluxes of the coil and the permanent magnet are combined as illustrated in Fig. 7, the flux from the coil substantially cancels that of the permanent magnet in the main and third flux paths 17 and 58 so that flux threads only the auxiliary path 19. Under this condition, the clutch armature 22 is drawn into frictional gripping engagement with its pole faces 23 to couple the driven shaft 11 to the drive shaft 26 and the brake armature 15 is released to rotate with the driven shaft.

In the modified construction of Figs. 6 to 9, the fixed cylinders 71 and 72, the rotatable cylinders 75 and 76, and the magnetic ring 79 spanning the fixed cylinders form a generally cylindrical core structure which cooperates with the permanent magnet 16 and the armatures 15 and 22 to define the main, auxiliary, and third flux paths 17, 19 and 58. The poles of the permanent magnet are connected to the respective pole pieces 24 and 25 of the clutch 21 by two magnetic members one of which is defined by the inner fixed cylinder 72 and the inner rotatable cylinder 76 and connects the inner pole piece 25 to the end pole of the magnet adjacent the brake 10. The other magnetic member connects the outer clutch pole piece 24 and the magnet end pole adjacent the coil 18 and is defined by the outer rotatable cylinder 75, the outer fixed cylinder 71, and the portion of the flat magnetic ring 79 between the outer fixed cylinder and the magnet.

In the novel torque producing apparatus described above, it is possible to energize the friction devices 10 and 21 alternately simply by energizing and deenergizing the single coil 18. Such energization is achieved without demagnetization of the permanent magnet 16 through the provision of the auxiliary flux path 19 into which the permanent magnet flux is diverted upon energization of the coil and through the arrangement of the latter within the auxiliary flux path 19 so that the coil produces a magnetomotive force across the permanent magnet having the same polarity as the magnet. Due to the weak permanent magnet 56, the third flux path 58, and the action of the coil springs 52 in the preferred form of the invention shown in Fig. 1, the flux of the main permanent magnet 16 is reduced substantially to zero in the clutch pole faces 23 so that the clutch armature is released effectually when the coil is deenergized. Reduction of flux in the clutch armature 22 upon deenergization of the coil 18 in the modified form of the invention shown in Fig. 6 is achieved by making the third flux path 58 of lower reluctance than the auxiliary path 19 through the armature.

The location of the U-shaped clutch core 33 of Fig. 1 concentrically within the brake core 32 with their pole faces 12 and 23 lying in the same plane enables the brake armature 15 to be mounted directly on and in the plane of the clutch armature 22 through the intermediary of the axially flexible disk 29. Thus, the axial dimension of the apparatus is reduced and the mounting of the armatures is simplified.

I claim as my invention:

1. The combination of, a magnetic torque producing friction device having axially engageable friction faces defined by radially spaced pole pieces and a magnetic armature ring spanning the pole pieces, means defining a toroidal flux path of low reluctance through said pole pieces and said armature and including a permanent magnet having both of its poles spaced along said path from said friction faces, a second similar device having an armature and radially spaced pole pieces terminating in pole faces spanned by the armature, means supporting the coacting parts of each of said devices for rotation relative to each other, a first member magnetically connecting one of said permanent magnet poles and one pole piece of said second device, a second magnetic member connecting the other pole piece of said second device and the other pole of said permanent magnet and cooperating with said first member to define a parallel toroidal flux path of higher reluctance through said permanent magnet and the friction faces of said second device, each of said members having fixed and rotatable parts closely telescoping together, and a stationary coil mounted within said higher reluctance flux path and operable when energized to divert the permanent magnet flux away from said low reluctance path and into said high reluctance path.

2. The combination of, a magnetic torque producing friction device having axially engageable friction surfaces formed on axially spaced annular pole pieces and an armature ring spanning the pole pieces, means defining a toroidal flux path of low reluctance through said pole pieces and said armature and including a permanent magnet having both of its poles spaced along said path from said friction surfaces, a second means providing a parallel toroidal flux path of higher reluctance through said permanent magnet and including a fixed part and a rotatable part having concentric annular surfaces telescoping closely together, said rotatable part having radially spaced and magnetically separated pole pieces terminating in axially facing pole faces, a second armature spanning and coacting with said pole faces to form a second torque producing device, and a coil mounted within said higher reluctance path and operable when energized to divert the permanent magnet flux away from the armature of said first device and through said second armature.

3. The combination of, a core of magnetic material defining a first pair of spaced pole faces and a second pair of spaced pole faces spaced from said first pair, two armatures one spanning and cooperating with each of said pairs of pole faces, a permanent magnet disposed within said core and forming a common part of three parallel flux paths one extending through each of said armatures and the third by-passing both armatures, the reluctances of said paths being correlated to cause a major portion of the permanent magnet flux to thread the path through one of said armatures, and a multiple turn winding disposed within said core and operable when energized to produce magnetic flux opposing the permanent magnet flux in said path through said one armature whereby the latter flux is diverted through the path extending through the other of said armatures.

4. The combination of, a core of magnetic material having fixed and rotatable parts telescoping closely together and defining a first pair of spaced pole faces and a second pair of spaced pole faces spaced from the first pair, two armatures, one spanning and adapted for cooperation with each of said pairs of pole faces, a stationary permanent magnet mounted on said stationary part of said core and cooperating with the latter and said armatures to define two parallel flux paths one of relatively low reluctance extending from the poles of the magnet and through said first pair of pole faces and the associated armature and another path of higher reluctance extending from the poles of the magnet and through said second pair of pole faces and the associated armature, the major portion of flux from said permanent magnet threading said low reluctance path, and a stationary coil mounted on said stationary core part and operable when energized to divert said permanent magnet flux away from said low reluctance path and into said high reluctance path.

5. An electromagnetic torque producing coupling having, in combination, a hollow stationary core member having a pair of annular concentric pole pieces terminating in a pair of axially facing pole faces, a rotatable armature spanning said pole faces and adapted for axial engagement therewith, a rotatable core member telescoping closely with said fixed core member and having annular concentric pole pieces terminating in a pair of axially facing pole faces, a second rotatable armature spanning and adapted for axial engagement with said pole faces of said rotatable core member, a permanent magnet disposed within said core members and cooperating therewith to define two flux paths of different reluctances both extending through the magnet and each extending through a different one of said armatures, and a coil disposed within said core members, said magnet and said coil cooperating to produce a flux threading one of said pairs of pole faces for drawing the associated armature into axial engagement therewith when the coil is deenergized and to cause flux to thread the other pair of pole faces to draw the other armature into engagement therewith when the coil is energized.

6. The combination of, two magnetic torque producing friction devices each having axially engageable friction faces defined by radially spaced pole pieces and a magnetic armature ring spanning the pole faces, means supporting the coacting parts of each of said devices for rotation relative to each other, means completing a toroidal flux path of low reluctance through the armature and pole faces of one of said devices and including a permanent magnet spanning the pole pieces of the device and having both of its poles spaced along said path from said friction faces, means completing a second toroidal flux path of higher reluctance through the pole faces and the armature of the other of said devices and comprising a member magnetically connecting one pole of said permanent magnet with one pole piece of the other device and a second member magnetically connecting the other permanent magnet pole with the other pole piece of the second device, and a multiple turn annular winding disposed within said higher reluctance path and operable when energized to produce a flux opposing the permanent magnet flux in said low reluctance path and diverting the latter flux into the higher reluctance path.

7. The combination of, a magnetic torque producing device having a first armature and spaced pole pieces terminating in spaced pole faces spanned by said armature, a permanent magnet spanning said pole pieces and cooperating with the latter and said armature to define a flux path of low reluctance extending from the poles of the magnet through the armature, a second magnetic torque producing device having a second armature and spaced pole pieces terminating in spaced pole faces spanned by the second armature, means magnetically connecting one pole of said permanent magnet with one of said second pole pieces and the other pole of the permanent magnet with the other of said second pole pieces to define a second flux path of higher reluctance by-passing said first armature and extending from the poles of the permanent magnet and through said second armature, and a multiple turn winding enclosing a part of said second flux path and arranged to produce a magnetic flux opposing the permanent magnet flux in said low reluctance path whereby the latter flux is diverted away from said first armature and into said second path through said second armature when the winding is energized.

8. The combination of, a first hollow ring of magnetic material of U-shaped cross section having annular pole pieces terminating at one end in axially facing pole faces, a second similar ring disposed within and concentric with the first ring and having annular pole pieces terminating at one end in pole faces facing axially in the same direction as said first pole faces, two concentric annular armatures one spanning and adapted for axial engagement with the pole faces of each of said rings, means mounting one of said armatures for rotation about the axis of said rings and for movement axially toward and away from its associated ring, means mounting the other of said armatures on said one armature for rotation with the latter and for axial movement toward and away from the other of said rings, and magnetic flux producing means cooperating with said rings and operable selectively to produce a flux threading the respective armatures to draw the latter alternately into engagement with their associated pole faces.

9. The combination of, a first hollow ring of magnetic material of U-shaped cross section having annular pole pieces terminating at one end in axially facing pole faces, a second similar ring disposed within and concentric with the first ring and having annular pole pieces terminating at one end in pole faces facing axially in the same direction as said first pole faces, the inner pole piece of said first ring and the outer pole piece of said second ring telescoping closely together, two concentric annular armatures one spanning and adapted for axial engagement with the pole faces of each of said rings, means mounting said armatures for rotation together about the axis of the rings and for movement axially relative to each other, and a permanent magnet and a coil mounted within said rings and operable when the coil is energized to cause flux to thread the pole faces and the armature of one of said rings, and, when the coil is deenergized, to cause flux to thread the pole faces and armature of the other ring.

10. The combination of, fixed and rotatable concentric rings of magnetic material of U-shaped cross section each having concentric annular pole faces terminating at one end in axially facing pole faces, the adjacent pole pieces of said rings telescoping closely together and each having its opposite end portions separated by a nonmagnetic spacer, a permanent magnet spanning the pole pieces of one of said rings between the pole faces and the spacer thereof and forming the common part of a flux path of low reluctance extending through said pole faces of said one ring and another parallel path of high reluctance extending back and forth across the gap between the rings and extending around the other ring and through the pole faces thereof, and a coil mounted within said stationary ring and arranged to produce a flux in said low reluctance path opposing the permanent magnet flux therein whereby to divert the latter flux into said high reluctance path and through said pole faces of said other ring.

11. The combination of, a core of magnetic material having a first pair of spaced pole faces and a second pair of spaced pole faces spaced from said first pair, two armatures one spanning and movable into and out of engagement with each of said pairs of pole faces, a permanent magnet disposed within said core and forming a common part of two parallel flux paths one of low reluctance extending through a first one of said armatures and the other of high reluctance by-passing the first armature and extending through the second armature, means yieldably urging said second armature away from and out of engagement with its associated pole faces to increase the reluctance of said high reluctance path and reduce the amount of permanent magnet flux threading the high reluctance path, and a multiple turn winding disposed within said core and operable when energized to produce magnetic flux opposing the permanent magnet flux in said low reluctance path and to cause sufficient flux to thread said high reluctance path to overcome said yieldable means and the gap between said second armature and its pole faces and draw the latter and the armature into engagement.

12. The combination of, a core of magnetic material having two spaced sets of pole pieces, the pole pieces of each set providing spaced pole faces, two armatures, one spanning the pole faces of each of said sets of pole pieces, a first permanent magnet mounted within said core and spanning the pole pieces of one of said sets at a point spaced from said pole faces thereof to form a common part of two parallel flux paths one of low reluctance extending through the pole faces of said one set and the armature thereof and another path of high reluctance by-passing said one set of pole faces and extending through the pole faces of the other set of pole pieces and the other armature, a coil disposed within said core and operable when energized to divert the permanent magnet flux away from said low reluctance path and into said high reluctance path, and a second permanent magnet weaker than said first permanent magnet and spanning the pole pieces of said other set to produce a flux in the pole faces thereof opposing the flux of the first permanent magnet when said coil is deenergized whereby to effect complete release of said other armature.

13. A clutch and brake unit having, in combination, two coaxial pairs of concentric rings of magnetic material, the rings of one of said pairs telescoping closely with the rings of the other pair at adjacent ends of each pair and the rings of each pair terminating at their opposite remote ends in axially facing pole faces, means supporting one of said pairs of rings stationarily and the other pair for rotation about the common axis of the rings, a rotatable armature spanning and adapted for axial gripping engagement with each of said pairs of fixed and rotatable pole faces, a permanent magnet disposed within said stationary rings and operable to cause a flux to thread said fixed pole faces and the associated armature, and a multiple turn annular winding disposed within said stationary rings and operable when energized to divert the flux of said permanent magnet away from said fixed pole faces and direct the same through said rotatable pole faces and the associated armature.

14. A clutch and brake unit having, in combination, fixed inner and outer concentric rings of magnetic material terminating at one end in a pair of axial facing pole faces and having radially facing pole faces at their opposite ends, a second pair of inner and outer rings concentric and telescoping closely at one end with said opposite ends of said first rings and having axially facing pole faces at their other ends, non-magnetic means rigidly connecting said second rings together as a unit for rotation about the axis of the rings, two rotatable armatures, one spanning and adapted for axial gripping engagement with each of said pairs of axially facing pole faces, and a permanent magnet and a multiple turn winding disposed within said fixed rings and operable when the coil is energized to cause a flux to thread said rotatable rings and the associated armature and, when the coil is deenergized, to cause a flux to thread said fixed axially facing pole faces and the associated armature.

15. An electromagnetic torque producing coupling having, in combination, a rotatable core member having concentric annular pole pieces terminating in axially facing pole faces, a rotatable armature adapted for axial gripping engagement with said pole faces, a hollow stationary core member having one pair of annular pole pieces closely telescoping with said rotatable pole pieces to provide a flux path from the stationary core member through said pole faces, said stationary core member having another pair of annular concentric pole pieces terminating in fixed axially facing pole faces, a second rotatable armature adapted for axial engagement with said stationary pole faces, a permanent magnet disposed within said stationary core member and operable to cause a flux to thread said fixed pole faces for drawing said second armature into engagement therewith, and a multiple turn annular coil disposed within said stationary core member and operable when energized to neutralize said permanent magnet flux threading said fixed pole faces and to cause flux to thread said rotatable pole faces for drawing said first armature into axial engagement therewith.

16. The combination of, a core of magnetic material providing two spaced pairs of spaced pole faces, an armature spanning and cooperating with each of said pairs of pole faces, a permanent magnet disposed within said core and forming a common part of three parallel flux paths one extending through each of said armatures and the third by-passing both armatures, the reluctances of said paths being correlated to cause a major portion of the permanent flux to thread the path through one of said armatures, and a multiple turn winding disposed within said core and operable when energized to produce magnetic flux opposing the permanent magnet flux in said by-pass path and the path through said one armature whereby the latter flux is diverted into the path through the other of said armatures.

17. The combination of, a core of magnetic material providing two spaced pairs of spaced pole faces, an armature spanning and cooperating with each of said pairs of pole faces, a permanent magnet disposed within said core and forming a common part of three parallel flux paths of different reluctances, one of said paths of intermediate reluctance by-passing both of said armatures and the other paths of highest and lowest reluctances extending through the respective armatures with the major portion of the permanent magnet flux threading the lowest reluctance path through one armature, and a multiple turn winding disposed within said core and operable when energized to force through said intermediate and lowest reluctance paths magnetic flux opposing the permanent magnet flux therethrough whereby to divert the latter flux through said highest path.

References Cited in the file of this patent

UNITED STATES PATENTS

| | | |
|---|---|---|
| 2,348,967 | Duby | May 16, 1944 |
| 2,544,360 | Schmidt | Mar. 6, 1951 |
| 2,612,248 | Feiertag | Sept. 30, 1952 |
| 2,614,668 | Waderlow | Oct. 21, 1952 |
| 2,646,145 | Durston | July 21, 1953 |
| 2,738,449 | Mason | Mar. 13, 1956 |